(12) United States Patent
Stevenson et al.

(10) Patent No.: US 6,300,428 B1
(45) Date of Patent: Oct. 9, 2001

(54) QUATERNIZED PRODUCT OF EPOXY RESIN, ACID AND TERTIARY AMINE WITH CURING AGENT

(75) Inventors: Thomas A. Stevenson, Pittsburgh, PA (US); Larry Brandenburger, Lino Lakes, MN (US); William McCarty, Lancaster, VA (US); John Mazza, Cheswick; Jeffrey Niederst, Pittsburgh, both of PA (US)

(73) Assignee: The Valspar Corporation, Minneapolis, MN (US)

( * ) Notice: Subject to any disclaimer, the term of this patent is extended or adjusted under 35 U.S.C. 154(b) by 0 days.

(21) Appl. No.: 09/492,407

(22) Filed: Jan. 27, 2000

Related U.S. Application Data

(62) Division of application No. 09/008,205, filed on Jan. 16, 1998, now Pat. No. 6,087,417.

(51) Int. Cl.[7] ............................. C08G 59/16; C08K 3/20; C08L 63/02; C08L 63/10
(52) U.S. Cl. ......................... 525/532; 522/84; 522/100; 522/101; 522/103; 523/414; 525/404; 525/407; 525/438; 525/523; 525/530; 525/531; 525/532; 525/486; 525/511
(58) Field of Search ........................ 427/386; 428/413, 428/416; 522/84, 100, 101, 103; 523/406, 409, 412, 414; 525/438, 530, 531, 404, 407, 486, 511, 523, 532; 528/108, 109, 113

(56) References Cited

U.S. PATENT DOCUMENTS

| | | |
|---|---|---|
| 3,943,187 | 3/1976 | Wu . |
| 4,021,396 | 5/1977 | Wu . |
| 4,247,439 | 1/1981 | Matthews et al. ............ 260/29.6 NR |
| 4,294,741 | 10/1981 | Bosso ................... 260/29.6 |
| 4,302,373 | 11/1981 | Steinmetz ............... 260/29.3 |
| 4,303,488 | 12/1981 | Seiler . |
| 4,303,565 | 12/1981 | Tobias . |
| 4,444,923 | 4/1984 | McCarty . |
| 4,446,258 | 5/1984 | Chu et al. ............. 523/406 |
| 4,446,260 | 5/1984 | Woods . |
| 4,480,058 | 10/1984 | Ting et al. ............. 523/404 |
| 4,486,280 | 12/1984 | Hosoi . |
| 4,990,364 | 2/1991 | Bolte . |
| 5,264,469 | 11/1993 | Mysliwczyk . |
| 5,296,525 | 3/1994 | Spencer ............... 523/408 |
| 5,389,704 | 2/1995 | Yabu ................. 528/398 |
| 5,522,851 | 6/1996 | Fayram ................ 607/5 |
| 5,527,840 | 6/1996 | Chutko et al. ......... 523/412 |
| 5,548,005 | 8/1996 | Kurth . |
| 5,681,684 | 10/1997 | Kinashi et al. ........ 430/280.1 |
| 5,686,511 | 11/1997 | Bobo . |

FOREIGN PATENT DOCUMENTS

| | | |
|---|---|---|
| 5-320568 | 12/1993 | (JP) . |
| 7-333848 | 12/1995 | (JP) . |
| 9-255741 | 9/1997 | (JP) . |
| 94/01224 | 1/1994 | (WO) . |

OTHER PUBLICATIONS

Markus, J., "UV Curing: The Basics", (1995).

*Primary Examiner*—Robert E. L. Sellers
(74) *Attorney, Agent, or Firm*—Schwegman, Lundberg, Woessner & Kluth, P.A.

(57) ABSTRACT

The invention provides aqueous, solvent based, and solvent-free curable coating compositions which include (A) the reaction product of an epoxy resin, acid, and tertiary amine; (B) a reactive diluent, and, optionally, (C) a curing agent. The compositions are useful for forming cured coated substrates, that are especially suitable for food and beverage packaging.

30 Claims, No Drawings

QUATERNIZED PRODUCT OF EPOXY RESIN, ACID AND TERTIARY AMINE WITH CURING AGENT

This application is a Divisional of U.S. Ser. No. 09/008,205, filed Jan. 16, 1998, U.S. Pat. No. 6,087,417.

BACKGROUND OF THE INVENTION

Coating compositions and methods for coating substrates with cured coating compositions have been known for years. A coating composition is typically applied as a film which may include water and/or organic solvent. The coating is typically applied on a substrate by a process such as lamination, solution or dispersion coating, powder coating, electrocoating, spraying, roll coating, or reverse roll coating. Coating compositions can also be applied as a film by extrusion in melt form through an extrusion coating die onto a substrate. Once coated to the substrate, the composition must dry and cure without defects within a few seconds as modern high speed coating lines heat the coated substrates rapidly to temperatures of up to 490° F. (254° C.). Many different types of substrates have been coated using such techniques, including wood, plastics, and metal in the form of sheets, strips or coils. Metal coated substrates are especially useful in the packaging, processing, and holding of foods and beverages.

It is desirable to avoid the use of excess organic solvent in a coating method so that the environmental hazards of allowing organic solvent to evaporate into the atmosphere are minimized. However, a relatively large quantity of organic solvent is typically required in order to process a coating composition and provide a coalesced film after drying.

A number of attempts have been made in the prior art to prepare aqueous, solvent based, or solvent free coating compositions suitable for use in a process for forming cured coated substrates. For example, a water-borne coating composition prepared by combining an epoxy resin, a carboxylic acid polymer, and an excess of tertiary amine to form a reaction product has been reported. This excess of amine provides a resin coating composition wherein polymeric quaternary ammonium salt linkages almost completely predominate over ester linkages. This process is carried out in a mixed organic and aqueous medium. In another variation, the reaction of an α,β-ethylenically unsaturated carboxylic acid with some of the oxirane groups prior to the formation of quaternary ammonium groups using a preformed carboxylic acid containing addition polymer has been described. Another solution based coating composition, which includes an aqueous epoxy ester emulsion prepared by forming a carboxyl bearing polymer in the presence of a defunctionalized epoxy resin in an organic solvent has been reported.

Solvent-free low-monomer or monomer-free hot melt compositions polymerizable by means of free radicals and suitable for use in coating various substrates have also been described. The compositions do not include quaternary ammonium compounds.

Conventional coating compositions containing quaternary ammonium salts typically suffer from the formation of extremely high molecular weight resins with high viscosity. Such compositions often possess such a high viscosity that application to a substrate can be hindered, resulting in problems of uneven flow and poor adhesion qualities. One other problem that commonly arises during attempted preparation of a water based coating composition is formation of an extremely high molecular weight product that will not dissolve in water. There is a continuing need for improved low viscosity coating compositions that can be applied to a substrate with excellent coating characteristics.

SUMMARY OF THE INVENTION

The invention provides a curable coating composition that may be formed in the absence of organic solvent or water. The invention also provides compositions that may be easily dispersed in water. The coating composition includes quaternized reaction product formed from epoxy resin, acid, and tertiary amine. The coating composition typically also includes reactive diluent and/or curing agent. As employed herein the term "quaternized reaction product" refers to compounds in which the oxirane groups originally present in the epoxy resin ("original oxirane groups") have been partially or completely converted into quaternary ammonium groups. Typically, the quaternized reaction product includes quaternary ammonium groups derived from at least about 25% of the original oxirane groups. The coating solids portion of the composition typically includes at least about 30 wt. % quaternized reaction product, from about 5 to 70 wt. % reactive diluent, and up to about 30 wt. % curing agent.

The invention also provides a method of forming a cured coated substrate in a solvent free, solvent based, or aqueous environment. The method includes applying the coating composition onto any of a wide variety of substrates, including but not limited to metal (e.g., metal coils), wood, and polymeric materials and curing the coated substrate. The curing process is often carried out as a two stage process—(i) an initial radiation initiated or relatively low temperature cure to cross link ("polymerize") the coating material; and (ii) a final bake to react the quaternary ammonium groups and bond the coating to the underlying substrate surface.

The coating composition can be applied in a solvent free, solvent based, or aqueous environment. For solvent free systems, the composition is applied to the substrate as a hot melt or liquid through the use of roll, slit, or slot coaters. For highly viscous compositions, a minimal amount of organic solvent may be employed to lower viscosity when using conventional application equipment such as roll coaters and the like. For aqueous based systems, water is added to produce a fully dissolved or dispersed aqueous coating composition capable of being applied to the substrate using conventional application equipment.

The method is generally completed by curing the coated substrate according to a one or two-step process. If desired, the coated substrate may initially be exposed to a radiation source, preferably ultra-violet light, causing any unsaturated carboxylic acids and any unsaturated diluents within the coated substrate to polymerize, to form a polymerized coated substrate. After the optional exposure to radiation, the substrate is typically baked to form the fully cured coated substrate. The bake can decompose the quaternary ammonium salts present in the quaternized reaction product, ensure adhesion of the coating to the substrate, and/or effect further crosslinking of the resinous or diluent components, e.g., through reaction of aminoplast or phenoplast curing agent(s) that may be present in the curing agent.

The invention also provides a cured coated substrate for the packaging of goods such as foods and beverages. The cured coated substrate is formed as described above, by applying the coating composition to the substrate and exposing the coated substrate to radiation, if necessary, and finally to heat.

DETAILED DESCRIPTION OF THE INVENTION

Definitions

The terms related to coating compositions and methods for coating substrates are used in accordance with the understanding of one skilled in the art, unless otherwise noted. For example, the terms "coating solids" and "coating solids component" refer to the sum of the mass of components used in the composition exclusive of water or organic solvent—e.g., epoxy resin, acid, tertiary amine, and any other reactive curing agents, reactive diluent components, or initiators that are employed. As used herein, "solvent" refers to a volatile liquid component of the composition which does not react during the curing or baking steps. Most of the solvent is generally volatilized during a baking step and does not become incorporated into the cured coating. The organic solvent is typically made up of saturated organic compound(s) having a molecular weight of less than about 300.

"Polymerization" or "polymerizable" denotes the curing or cross-linking of the coating composition after a coated substrate is exposed to radiation (e.g., ultra-violet or electron beam), heat, or other means of initiating polymerization. "Thermosettable" or "thermoset" refers to a composition that is transformed into a gel structure by application of radiation and/or heat. A gel structure is one that is largely insoluble in any solvent.

Curable Coating Composition

The coating compositions of this invention may be formed by blending (A) the reaction product of (1) epoxy resin, (2) acid, and (3) tertiary amine with (B) a reactive diluent, and optionally, (C) a curing agent. The above combination of reactants allows production of a reaction product that can be dissolved or dispersed in water or solvent and has excellent stability and cured film properties. In applications where a polymer hot melt free of water and organic solvent is to be employed, a reactive diluent is not necessarily required. Preferably, versions of the combination to be applied as a hot melt include at least 5 wt. % of the reactive diluent as a processing aid and to enhance the flow and/or leveling properties of the composition. The above combination of reactants also provides for a reaction product that may be readily dissolved in water and has excellent stability and cured film properties.

The reaction of a mixture which includes the epoxy resin, the acid and the tertiary amine is typically carried out to yield a product which includes quaternary ammonium salt(s) of the acid. This reaction can conveniently be carried out at a temperature of about 70°–120° C. Alternatively, the epoxy resin may be reacted with the tertiary amine form a resin having quaternary ammonium hydroxide groups which are subsequently converted into quaternary ammonium acid salts through reaction with the acid. The acid typically includes carboxylic acid(s), sulfonic acid(s), and/or phosphorus-based acid(s).

It is the formation of quaternary salt groups that contributes toward the solubility or dispersibility, and stabilization in water of the aqueous coating composition. By maintaining a molar amount of tertiary amine that is nearly equal to or greater than the molar amount of the oxirane groups, a quaternary amine salt complex can be ensured as most oxirane groups undergo a ring opening reaction with the tertiary amine.

The curable coating composition may be prepared as high solids or water based coatings depending on the salt content of the mixture of components A, B, and C. In general the salt content (neutralized acid) should be greater than about 25 mg KOH per gram of coating solids to ensure stability of the coating solids in an aqueous medium.

The reaction product (A) may be formed in several steps. The first step (A1) may be carried out between an oxirane containing resin and a monocarboxylic acid using a catalytic amount of esterification catalyst (e.g., a trialkyl amine) to convert up to 75% of the oxirane groups to ester groups. The reaction may contain a deficiency of acid so as to limit the amount of oxirane converted, or an excess of acid may be employed provided that the second step of the reaction is begun when the desired level of esterification is reached. The acid used in step A1 may be a mixture of acids in which at least about 50 mole % is typically $\alpha,\beta$-ethylenically unsaturated while the balance may be saturated.

The preferred esterification catalysts are hindered amines such as tri-n-butyl amine and dimethyl benzyl amine, with dimethyl benzyl amine being most preferred due to its low basicity. The preferred hindered amines are generally used in an amount of about 0.10 to 1.0 percent by weight based on the total weight of carboxy functional and epoxy functional reactants.

Once the desired fraction of the oxirane groups is esterified, a second step (A2) typically proceeds by adding additional tertiary amine and carboxylic acid to quaternize the remaining oxirane groups. The ratio of acid or amine to oxirane present in step (A2) (i.e., oxirane groups remaining after esterification) is typically between 1.0 and 4.0. The oxirane converted in step A2 is believed to be primarily a quaternary ammonium ion salted with the unsaturated acid.

As an alternative to the two-step process outlined above, the reaction may be carried out as a single step (A1+A2) process in which the amine to oxirane ratio is controlled to lie between 0.25 and 4.0. In this way the amount of oxirane converted to ester can be controlled to be between 75% and a lower level approaching zero. Where some degree of esterification is desired, the reaction may be carried out in a single step using less than a stoichiometric ratio of amine to oxirane groups and at least 1.0 equivalent of carboxylic acid per equivalent of oxirane groups n the epoxy resin. Under such conditions, substantially all of the amine reacts with oxirane to form a quaternary ammonium salt and the remaining oxirane groups typically react with carboxylic acid to form esters.

As a further modification of the invention, some or all of the unsaturated acid used in the step A2 may be prepolymerized into an addition polymer using readily available monomers such as styrene and/or the esters of acrylic or methacrylic acid. These monomers are preferred due to their relatively low price, ready availability and long history of use in packaging coatings.

In one embodiment of the invention, the reaction product formed contains 0 to 37.5% saturated esters formed from oxirane groups, 0 to 75% unsaturated esters formed from oxirane groups, and between 25 and 100% quaternary ammonium salts formed from oxirane groups, tertiary amine and $\alpha,\beta$-ethylenically unsaturated carboxylic acids. Alternatively, as where the reaction product is formed in a single step, the reaction product may contain roughly the same ratio of saturated and unsaturated acids incorporated into both the ester and quaternary ammonium salt groups. As mentioned herein, the unsaturated carboxylic acid used in the formation of quaternary ammonium salts may be prepolymerized into an addition polymer prior to the quaternization reaction or may be present as monomeric acid salts.

In this way a number of compositions may be made that are readily soluble in a variety of reactive diluents and/or water depending on the salt content of the composition. The coating composition is desirably formed in the absence of any organic solvent. However, depending on the application and physical property requirements, up to 30 wt. % organic solvent and/or up to 60–70 wt. % water may be used as an application and processing aid. Even when formulated as an aqueous coating, the composition typically includes at least about 30 wt. % coating solids.

Epoxy Resin

The present coating compositions may be prepared using a variety of epoxy resins. Aromatic polyether-based epoxy resins are preferred, particularly those derived from the condensation of bisphenols (such as bisphenol A, bisphenol F, or bisphenol S) with epichlorohydrin (also referred to as a "Bisphenol A glycidyl polyether"). The epoxy resin used in the composition of this invention is typically an aromatic polyether containing between 1 and 3 oxirane groups ("epoxy groups") per molecule and preferably contain an average of about two terminal epoxy groups per molecule. Epoxy resins having oxirane functionality greater or less than two can also be used to good effect. The oxirane groups are capable of being reacted with tertiary amine and carboxylic acid to form a quaternary ammonium salt of the carboxylic acid.

Aromatic polyethers containing oxirane functionality are well known in the art and are commercially available. Such polyethers often are based on a bisphenol structure wherein the two aromatic groups are joined through a divalent hydrocarbon group. Preferred epoxy resins include aromatic polyethers, such as those derived from the condensation of a bisphenol like Bisphenol A, and epichlorohydrin.

Although higher molecular weight epoxy resins (e.g., having epoxy equivalent weights of about 1000 to 5000) can be purchased from commercial sources, it is often practical to start with lower molecular weight epoxy resins and merely chain extend the same in a known manner through reaction with divalent compounds such as bisphenol A, bisphenol F, bisphenol S, their counterparts resulting from hydrogenation of the aromatic rings, or their halogenated analogs. As recognized in the art, epoxy resins prepared by the condensation of bisphenols and epichlorohydrin contain a mixture of diepoxides, monoepoxides and ethers devoid of epoxy groups. While the average "oxirane functionality" (i.e., number of oxirane groups per molecule) of such mixtures may range widely, the epoxy resins used to produce the present coating compositions usually have an oxirane functionality of at least about 1.5 and, preferably, from about 1.8 to about 3.

The molecular weight of the epoxy resin varies depending on the particular end use and method of application. For solvent-free or solvent based curable coating compositions, the epoxy resins have an epoxy equivalent weight range of about 180–10,000, with a preferred range from about 500–6,000. For aqueous curable coating compositions, the epoxy resins have an epoxy equivalent weight range of about 180–5000, with a preferred range of from about 500–3500.

Acid Component

The acid component used in preparing component the quaternized reaction product may include carboxylic acid(s), sulfonic acid(s), and/or phosphorus-based acid(s). Examples of suitable phosphorus-based acids include a phosphoric acid partial esters (i.e., mono- or diesters of phosphoric acid), phosphonic acids or phosphoric acid monoesters.

Unsaturated and saturated acids may be employed in combination with each other. When mixtures of unsaturated and saturated acids are used, the mixture's proportion may vary, but generally at least about 50 mole % of the acid component is made up of unsaturated acid with the balance saturated acid depending on the extent of crosslinking desired in the cured coating. Of the unsaturated and saturated acids mixtures that can be employed, a mixture of acrylic acid and lactic acid is one example of a particularly suitable combination.

In a typical embodiment of the invention, the acid includes α,β-ethylenically unsaturated carboxylic acid(s). The acid may also include saturated carboxylic acid(s). Typically, however, the saturated carboxylic acid makes up no more than about 50 mole % of the carboxylic acid component, and preferably no more than about 25 mole % of the total acid. Suitable unsaturated carboxylic acids include acrylic acid, methacrylic acid, fumaric acid, maleic acid, crotonic acid, itaconic acid, cinnamic acid, and 2,4-hexadienoic acid. "(Meth)acrylic acids" of the formula $CH_2CH(R)CO_2H$ are particularly suitable α,β-ethylenically unsaturated carboxylic acids. The R group of the (meth) acrylic acid is H or a lower alkyl group (i.e., an alkyl having one to six carbon atoms) and, preferably, H or methyl. Acrylic acid is a preferred α,β-ethylenically unsaturated carboxylic acid because of its hydrophilicity and high reactivity toward free radical polymerization.

The quaternary ammonium salt groups may also be formed from phosphorus-based acid(s), either solely or in combination with another type of acid, such as carboxylic acid(s). Examples of suitable phosphorus-based acids include phosphoric acid or a phosphonic acid partially esterified with an alcohol which includes an ethylenically unsaturated moiety. Other examples of suitable phosphorus-based acids include ethylenically unsaturated phosphonic acids, such as acryloyloxymethylphosphonic acid. Particularly suitable examples of phosphorus-based acids include partial esters of phosphoric acid. For example, hydroxyalkyl (meth)acrylates can be used to form such partial esters of a phosphorus-based acid. Mono- and diesters of phosphoric acid formed through esterification with hydroxyethyl methacrylate, hydroxyethyl acrylate, hydroxypropyl methacrylate, and/or hydroxypropyl acrylate are preferred examples of phosphorus-based acid which can be employed in forming the quaternized reaction product. Phosphoric acid partial esters of this type can be prepared by reacting $P_2O_5$ which the corresponding hydroxyalkyl (meth)acrylate.

As mentioned above, the quaternary ammonium salt groups may also be formed from acid which includes sulfonic acid. Examples of ethylenically unsaturated sulfonic acids which may be employed in the present invention include acrylamidoalkane-sulfonic acids, such as 2-(acrylamido)-2-methyl-1-propanesulfonic acid ("AMPS"), and sulfoalkyl (meth)acrylates, such as 2-sulfoethyl acrylate, 2-sulfopropyl methacrylate, 3-sulfopropyl acrylate, and 3-sulfopropyl methacrylate.

To provide water dispersibility, the quantity of ionizable acid present in the aqueous coating composition should be sufficient to provide an acid number of at least 25 in the final reaction product, based on the solids portion of the aqueous composition. The acid number as used in reference to the present compositions is the number of milligrams of potassium hydroxide required to neutralize one gram of solids portion of the composition. The portion of ionized acid due to quaternary ammonium groups cannot be titrated in this manner but may be estimated by assuming that all amine reacts with oxirane to form quaternary ammonium groups during the reaction step A2 outlined above.

In general, the more hydrophilic the acid (e.g., lactic >acetic >acrylic >>ascorbic) the greater the surfactant power of the reaction product, which results in higher application coating solids (i.e., less wetting problems during application) and better viscosity stability as a function of temperature. Generally, the equivalent ratio of acid to oxirane groups is about 0.8 to 4.0, with a ratio of 0.9 to 1.0 preferred for hot melts and high solids coatings, and 0.9 to 4.0 preferred for water based coatings.

Tertiary Amine

Nearly any tertiary amine can be used to react with the epoxy resin and the carboxylic acid to form the coating composition of the invention. The tertiary amine may be represented by the structure $R^1R^2R^3N$, wherein $R^1$, $R^2$, and $R^3$ are independently $C_{1-6}$ alkyl, $C_{1-6}$ alkyl-(OH), or benzyl. The alkyl groups can be straight-chain or branched. Suitable candidates include trimethyl amine, dimethyl ethanol amine, methyl diethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, and mixtures thereof. Dimethyl amines, such a dimethyl benzyl amine and dimethyl ethanolamine, are particularly suitable. Preferred are those tertiary amines that contain only methyl or ethanol groups, e.g., dimethyl ethanolamine.

The amount of amine present in the reaction product A will vary depending on the level of esterification desired. The level of amine to oxirane will generally vary between about 0.25 and 1.3. In those cases where all of the unsaturated acid is prepolymerized into an addition polymer prior to the quaternization step the upper level of amine employed may be increased to a level equal to the amount of acid employed. Thus the range of amine present in the reaction product (A) relating to oxirane groups initially present in the unreacted mixture may vary from about 0.25 to 4.0. This higher level of amine is particularly useful when there is insufficient quaternary groups present to allow stable dispersibility in water. In the case of hot melts and high solids a lower range of about 0.25 to 1.3 is typically preferred.

Reactive Diluents

The curable coating composition of this invention is typically formed by mixing the reaction product of an epoxy resin, carboxylic acid, and tertiary amine with a reactive diluent, such as a mono- and/or polyfunctional ester of a (meth)acrylic acid (e.g., acrylic acid) with a polyether, polyester, or hydroxy-terminated polyether or polyester. (Meth)acrylic mono- and diesters of a number of polyether compounds are available commercially and can be used to good effect to modify the crosslink density and glass transition temperature of the cured epoxy-vinyl polymer coated substrates. Similarly, preformed hydroxyl terminated polyesters and polyethers are available commercially and can be used to good effect.

Among suitable ethylenically unsaturated reactive diluents are the mono and diesters of polyoxyalkylene ethers such as polyethers prepared from ethylene and propylene oxide. Suitable diluents include polyalkylene glycol mono-(meth)acrylates, polyalkylene glycol di(meth)acrylates, and lower alkoxy polyalkylene glycol (meth)acrylates. Other suitable diluents include the acrylic acid ester of polyesters and polyethers and hydroxyl functional polyethers and polyesters. Preferably, the ethylenically unsaturated reactive diluents include methoxy polyethylene glycol acrylates and polyethylene glycol diacrylates formed from polyethylene glycol(s) having a MW of about 250 to about 1000 and more preferably about 300 to about 700. Examples include the mono-acrylate of 350 MW methoxy-polyethylene glycol (CD-551 available from Sartomer)and the diacrylate of 600 MW polyethylene glycol (Sartomer SR-610). Where the coating is to be applied to a metal substrate which will undergo further post cure fabrication, a coating which is more flexible while remaining impervious is generally desired. This can be achieved by employing versions of the present coating compositions which include at least about 50 wt. % and preferably at least about 90% polyoxyalkylene glycol monoacrylate ester as the reactive diluent.

A number of hydroxyl terminated polyethers and polyesters are also available and may be employed as a reactive diluent. Among these the polyethylene oxide adduct of Bisphenol A (Desonic Bis A-7 available from Witco) is particularly suitable.

Reactive diluents such as mono and polyfunctional esters of acrylic acid with polyethers and polyesters and/or hydroxyl terminated polyethers and polyesters can be used in amounts up to 70 wt. % of the coating solids. Preferably, these diluents are used in amounts less than 50 wt. % of the coating solids, and most preferably between 5 and 30 wt. % of the coating solids.

The principal role of the reactive diluent is to act as a solvent during mixing of the epoxy resin, carboxylic acid, and tertiary amine. These diluents also help keep application coating solids high by lowering viscosity and improve the flow and leveling of the coating composition. The molecular weight of the reactive diluents typically are important especially when using elevated temperatures to effect cure. When using radiation, such as electron beam or ultraviolet light, to effect cure the molecular weight is less critical but is typically at least about 200. When heat alone is employed to cure the coating, the molecular weight of the reactive diluent is generally between about 300 and about 1000.

The Curing Agents

The curable coating composition may include curing agents, such as aminoplast resins, phenoplast resins, or mixtures thereof, depending on the amount of saturated acid or hydroxyl bearing diluent employed. When only unsaturated acids are employed and only unsaturated diluents are used and cure is effected by electron beam, then no curing agent need be present in the composition. When substantial amounts of saturated acids are used and hydroxyl bearing diluents are present, a curing agent may be employed in an amount up to about 30 wt. % of the coating solids. Intermediate cases will require intermediate levels of curing agent with the amount used readily determinable by one of skill in the art.

Included with the curing agent portion of the coating are photoinitiators and/or heat sensitive free radical initiators. Any of the commonly used photoinitiators may be used. Among these Irgacure 2959 (2-hydroxy-1-[4-(hydroxyethoxy)phenyl)-2-methyl-1-propanone; available from Ciba GIEGY) or the combination of benzophenone and a tertiary amine are examples of suitable initiators for use with the water-based coatings described herein. Initiator levels may vary from 1 to 5 wt. % depending on the oxygen content of the atmosphere over the coating, the coating viscosity at the point of cure, the line speed, and the number and intensity of the ultraviolet lights employed.

Free radical initiators are generally used at levels between 2 and 10 wt. % depending on the oxygen content of the curing atmosphere, the coating viscosity at cure temperature, and the time and temperature profile of the coating during cure. In general, the lower level would be sufficient if cure is conducted in an oxygen-free environment and for a time at temperature equal to about 2 to 3 times the half life of the initiator. Otherwise, the nature of the free radical initiator is not particularly important.

Various inhibitors may be added to the combination of reactants in order to prevent premature polymerization of the reaction product. Suitable inhibitors include monomethyl ether hydroquinone (MEHQ), hydroquinone, phenothiazine, and alkyl substituted phenol based inhibitors (e.g., butylated hydroxytoluene—"BHT") which are well known in the art. Such inhibitors are typically included in the present compositions.

Surfactants and other coating additives, as well known in the art can also be added to the coating composition. Among the surfactants which are suitable for use in the present coating compositions are unsaturated hydroxy-functional surfactants such as hydroxy-functional alkyne surfactants. Surfynol SEF (available from Air Products) is an example of a suitable surfactant.

Aqueous Coating Composition

Aqueous versions of the present curable coating composition typically include at least about 25 wt. % of a coating solids component and about 50 to about 75 wt. % water. Preferably, the aqueous coating compositions have a coating solids content of about 25 to about 40 wt. % and a #4 Ford cup viscosity (at 25° C.) of about 15 to about 75 seconds. The coating solids component typically includes:

(A) at least about 30 wt. % of quaternized reaction product obtained from reactants comprising:
  (1) an epoxy resin having an epoxy equivalent weight of about 180 to about 5,000 (preferably about 500 to about 3,500);
  (2) a sufficient amount of carboxylic acid to provide about 0.8 to about 4 equivalents of carboxylic acid groups per equivalent of original oxirane groups in the epoxy resin; and
  (3) about 0.25 to about 4 equivalents of tertiary amine per equivalent of the original oxirane groups;
    wherein the quaternized reaction product includes at least about 0.25 equivalents of quaternary ammonium salts of the carboxylic acid per equivalent of the original oxirane groups; and
(B) at least about 5 wt. % reactive diluent having a molecular weight of at least about 200.

The coating solids component of aqueous versions of the present composition typically has a neutralized acid number of at least about 25. Preferably, the coating solids component includes about 65 to about 95 wt. % of the quaternized reaction product and about 5 to about 35 wt. % of the reactive diluent. The quaternized reaction product is preferably formed from reactants which include about 0.9 to about 1.1 equivalents of the carboxylic acid per equivalent of the oxirane groups originally present in the epoxy resin (i.e., "original oxirane groups") and about 0.7 to about 0.95 equivalent of the tertiary amine per equivalent of the original oxirane groups. Most preferably, the aqueous coating composition contains a reactive diluent which includes methoxy-polyethylene glycol acrylate and/or polyethylene glycol diacrylate and a quaternized reaction product formed from epoxy resin including Bisphenol A glycidyl polyether, carboxylic acid including acrylic acid and tertiary amine including dimethylethanolamine. The reaction to form the quaternary reaction product is generally comicted such that at least about 25% of original oxirane groups have been converted into quaternary ammonium groups.

Method For Forming a Cured Coated Substrate

For the formation of an aqueous coating composition, water is added to the mixture over a period of about 0.5–2 hours while the temperature is maintained at about 70°–100° C. The aqueous coating composition, an aqueous solution of a quaternary ammonium-amine salt of a carboxylic acid, is held at a time and temperature sufficient to allow complete dispersibility of the quaternary ammonium salts. The exact time will vary, but the mixture is held generally for about 0–2 hours. During this time the temperature is typically allowed to decrease freely.

Photoinitiators or thermally activated free radical initiators may be added to the aqueous coating composition in up to about 10 wt. % and preferably about 1 to about 5 wt. % of the coating solids. One example of a suitable photoinitiator is Irgacure 2959 (2-hydroxy-1-[4-(hydroxyethoxy)phenyl)-2-methyl-1-propanone; available from Ciba GIEGY). Surfactants and other coating additives, as well known in the art, can also be added to the aqueous coating composition, Surfynol SEF being an example of a suitable surfactant. The coating composition is usually filtered as the final preparation step.

The present method proceeds by applying the coating composition to the substrate as an aqueous, solvent-free (i.e., a hot melt or liquid), or a solvent diluted composition. The hot melt or liquid composition can be applied by a variety of techniques and equipment, including: heated multi-roller application equipment; slotted nozzles or blades; spray guns, or other similar equipment.

The aqueous coating composition can be applied by a variety of techniques and to a variety of substrates known in the art, including direct roll coating, spray coating, reverse roll coating, dip coating, hanger coating, and the like. This invention is particularly suitable for roll coating. The aqueous coating composition is applied to a substrate to form a coated substrate in a manner that provides a coating of the desired thickness to the substrate. The aqueous coating composition is typically formulated to have a #4 Ford cup viscosity of about 15 to about 75 seconds at 25° C. with a coating solids content of about 25 to about 40 wt. %.

While no organic solvent need be present during the application of coating composition to the substrate, up to 30 wt. % organic solvent and/or up to 70 wt. % water can be employed as plate wetting agents and as necessary to lower viscosity when using conventional application equipment such as roll coaters and the like. For environmental and cost reasons, it is generally preferred to minimize the level of volatile organic solvent in the composition.

Suitable types of substrates include, for example, wood, plastics or polymers that have a relatively high glass transition temperature ($T_g$) and/or melting point, and metals. The substrate can be a flat sheet or coil of the desired material, or may have a more complex profile such as a pipe, tube, wire, or other shape. Particularly useful substrates include metals such as aluminum, stainless steel, hot rolled steel, galvanized steel coil, and sheet metal as well as polymeric materials such as polyesters, acrylic polycarbonates, polyolefins, epoxy polymers and the like. Metals are the preferred substrate, with aluminum and steel especially preferred.

If desired, the coated substrate can be dried prior to polymerization and heating. During the optional drying step, the coated substrate is typically briefly pre-baked to remove any water or solvent using either a infrared drying unit, a conventional oven, or forced hot air. Usually this drying step is neither necessary nor desirable.

Forming The Cured Coated Substrate

The curing step of the present method typically involves polymerizing and then thermosetting the coated substrate to form the cured coated substrate. Examples of suitable methods of polymerizing the coated substrate include heat treatment, exposure to ultraviolet radiation and exposure to electron beam radiation. One or more polymerizing treatments or steps, which can be the same or different, may be performed as necessary. The preferred method of polymerizing the coated substrate is to expose the coated substrate to ultraviolet radiation when unsaturated carboxylic acids and diluents are employed.

Subsequent to polymerizing, the coated substrate is exposed to heat to complete the cure and ensure adhesion to the substrate. Typical oven conditions will vary from about 10 seconds at 495° F. (257° C.) to about 10 minutes at 400° F. (204° C.) when using conventional curing ovens. When using a final infrared ("IR") cure, only 1 to 15 seconds are normally required. The baked coating is clear, hard, and glossy with adhesion to metal and excellent resistance to boiling water.

During exposure to ultra-violet or electron beam radiation, any unsaturated groups in the coating composition polymerize (i.e., the acrylate groups contained in the quaternary salts are polymerized). The resulting UV polymerized coated substrate is typically heated at about 400° F. (204° C.) or above to decompose the quaternary ammonium salt groups and to provide the desired adhesion of the coating to the substrate. If all of the components of the coating composition exceed about 300 in molecular weight, then the radiation cure step can be eliminated by incorporating a heat sensitive free radical initiator.

After forming the cured coated substrate, the substrate is cooled to a temperature where it may be further handled and processed as desired without damaging the cured coating layer. Cooling may be accomplished by any known method, such as by open air or forced air, water sprays, streams, or baths, or refrigeration. When the coating has cooled and set so that the cured coated substrate may be handled without damage to the coating, the coated substrate may be stored or further processed as desired.

The method for forming cured coated substrates is useful for the interior and exterior coating of metal containers that will come in contact with food or beverages. The method is especially useful for making can ends and can bodies where a high degree of flexibility and corrosion resistance is needed. Additionally, this invention can be used as a side seam coating for the interior of food and/or beverage cans. Side seam coating are generally applied as thick films and require blister resistant coatings.

Low Solvent Coating Compositions

For some applications, coating compositions which are substantially or entirely free of organic solvent and water (referred to herein as "low solvent coating compositions" and "solvent-free coating compositions" respectively) may be desirable. Compositions of this type are particularly suitable where the coating is to be applied to the substrates by methods such as extrusion or slot coating. Such coating compositions include at least about 30 wt. % (preferably at least about 65 wt. % or higher) quaternized reaction product. The quaternized reaction product is preferably formed from reactants which include:

(1) epoxy resin having an epoxy equivalent weight of about 500 to 6,000;

(2) a sufficient amount of acid to provide about 0.8 to about 1.3 equivalents of acid groups per equivalent of original oxirane groups in the epoxy resin; and (3) about 0.25 to about 1.3 equivalents of a tertiary amine per equivalent of the original oxirane groups.

The stoichiometry of the reactants and reaction conditions are generally chosen such that the quaternized product includes at least about 0.25 equivalents of quaternary ammonium salts of the acid per equivalent of the original oxirane groups (i.e., per equivalents of oxirane groups present in the epoxy resin prior to reaction with the tertiary amine and carboxylic acid). Preferably, the. solvent-free coating compositions also include at least about 5 wt. % reactive diluent having a molecular weight of at least about 200. Where the composition is to be cured solely by heating, the reactive diluent typically has a molecular weight of at least about 300.

The ingredients may be combined at room temperature if in the liquid state or heat may be applied to melt the ingredients, with stirring to provide a uniform mixture. A minor amount of an organic solvent and/or water, preferably less than about 30 wt-%, may be added to improve processability, although it is highly desirable to use little or no solvent. The mixture is heated to a temperature of about 70 to 120° C. and allowed to react with continued stirring until the reaction is complete.

If desired, other components may be added to the hot melt coating composition. Examples of such components include pigments, dyes or other coloring agents; free radical inhibitors; antioxidants ultraviolet light absorbers, hindered amine light stabilizers or other preservatives; and plasticizers. Other compatible additives may also be used as desired.

The substrate may optionally be subjected to any desired preparation or treatment steps before application of the coating composition. Examples of such treatments include cleaning, corona treatments, flame treatment, and application of primers, adhesives or other layers. After the desired preparation has taken place, the substrate may be heated to a temperature that will facilitate adhesion of the coating material to the substrate. Generally this is a temperature that is below the curing point of the polymer composition but above the $T_g$ of the composition. Preferably, the substrate is heated to about 40° to 220° C.

The coating composition is applied to the substrate using any suitable method, such as extrusion or roll coating in a manner that provides a coating of the desired thickness to the substrate. Extrusion typically takes place using a slot or sheet die wherein the gap may be adjusted to the desired width. Such dies are known to those of skill in the art and are commercially available. Any extrusion method that provides a coating layer of the desired thickness may be used. The type of extrusion method selected will depend on factors known to those of skill in the art, such as the desired coating thickness, the viscosity of the coating material at the application temperature, the degree of adhesion between the substrate and the coating material, and so on. If desired, a gap may exist between the die and the substrate, to allow for air cooling of the coating material before the material is drawn to the desired thickness.

Alternatively, the coating material may be applied directly to a heated roll, which then applies the material to the substrate. One or more rolls may be used as necessary to provide a coating with the desired thickness and other characteristics. For example, the coating may be drawn to the desired thickness by one set of rolls, then smoothed and/or cooled by another set of rolls and applied to the substrate by a final set of rolls.

After the coating composition is applied to the substrate, the coated substrate is polymerized, e.g., by ultraviolet or electron beam, to form a polymerized substrate. Thermal curing of the polymerized substrate is typically then effected by heating the coated substrate to about 380° to 500° F. (193° to 260° C.) for times that vary from 10 minutes at lower temperatures to as short as about 10 seconds at higher temperature.

After curing, the coated substrate is generally cooled to a temperature where it may be further handled and processed as desired without damaging the cured coating layer. Cooling may be accomplished by any known method, such as by open air or forced air, water sprays, streams, or baths, or refrigeration. When the coating has cooled and set so that the coated substrate may be handled without damage to the coating, the coated substrate may be stored or further processed as desired.

The following examples serve to illustrate the present invention and are not meant to limit the invention in any way.

EXAMPLE 1

A mixture of an epoxy resin, a carboxylic acid, and a tertiary amine is prepared. To a three liter round bottom flask equipped with a stirrer, heater, a reflux condenser, and a nitrogen inlet port is charged 491 grams of Epon 828 epoxy resin available from Shell Chemical Co., 209 grams of Bisphenol A, and 0.7 grams of Shell Catalyst 1201. The mixture is blanketed with nitrogen while heating to 120° C. After allowing the mixture to exotherm to 170° C. the reaction is held at 157° C. for one to two hours. At the end of the hold the nitrogen blanket is replaced with a compressed air sweep and the reaction is cooled to 140° C.

A premix of 300 grams of Sartomer SR-256 (tri-ethylene glycol mono-acrylate) and 1 gram of mono methyl ether hydroquinone ("MEHQ") is added over 10–30 minutes. The reaction is held for 30 minutes at 120–140° C. to ensure uniformity before cooling to 70–75° C. The reaction is held for 10 minutes after adding 52 grams of acrylic acid (0.95 equivalents on determined epoxy value) before dripping in 68 grams of DMEOA (0.97) over 10 minutes.

After the amine is all in, 0.1 grams of phenothiazine is added and the reaction is held for one hour at 70–100° C. Cooling is applied as necessary to control the exotherm below 100° C.

EXAMPLE 2

Example 2 is prepared similarly to Example 1 except 300 grams of Sartomer SR-344 (polyethylene glycol (400 MW) diacrylate) are substituted for the 300 grams of SR-256.

EXAMPLE 3

Example 3 is prepared similarly to Example 1 except 43.3 grams of acetic acid are substituted for the 52 grams of acrylic acid.

EXAMPLE 4

Example 4 is prepared similarly to Example 1 except 300 grams of Sartomer SR-344 (polyethylene glycol (400 MW) diacrylate) are substituted for the 300 grams of SR-256 and 43.3 grams of acetic acid are substituted for the 52 grams of acrylic acid.

EXAMPLE 5

Example 5 is prepared similarly to Example 1 except 300 grams of Sartomer SR-344 (polyethylene glycol (400 MW) diacrylate) are substituted for the 300 grams of SR-256 and 65 grams of lactic acid are substituted for the 52 grams of acrylic acid.

EXAMPLE 6

To a five-liter round bottom flask equipped with stirrer, heater, reflux condenser, and a nitrogen inlet port is charged 1000 g grams of Epon 828, 426 grams of Bisphenol A, and 1.4 grams of Shell Catalyst 1201. The mixture is blanketed with nitrogen while heating to 130° C. After allowing the mixture to exotherm to 175° C. the reaction is held at 157° C. for one hour. At the end of the hold epoxy value sample is taken (EV-1.06 mmol/g) before 357 grams of Desonic Bis A-7 (BPA ethoxylated with 14 moles of ethylene oxide available from Witco) is added and the reaction is cooled to 100° C. over the course of an hour. The reaction is held for 10 minutes after adding 136 grams of lactic acid (1.0 equivalents on determined epoxy value) before dripping in 132 grams of DMEOA (0.97 equivalents) over 10 minutes. The reaction exotherms to 132° C. before cooling returns the temperature to 106–121° C. The reaction is held for one hour. Deionized water (3400 grams) is dripped into the reaction over an hour. Heat is shut off after 2000 grams of water is added to the reaction mixture. The mixture is stirred for an additional 1.5 hours before discharging and filtering through common sense filters.

EXAMPLE 7

To a five-liter round bottom flask equipped with stirrer, heater, reflux condenser, and a nitrogen inlet port is charged 746 g grams of Epon 828, 379 grams of Bisphenol A, and 1.1 grams of Shell Catalyst 1201. The mixture is blanketed with nitrogen while heating to 130° C. After allowing the mixture to exotherm to 185° C. the reaction is held at 157° C. for one hour. At the end of the hold epoxy value sample is taken (EV=0.52 mmol/g) before 286 grams of Butyl Cellosolve (Ethoxylated butanol) is added and the reaction is cooled to 100° C. over the course of 45 minutes. The reaction is held for 40 minutes after adding 52.6 grams of lactic acid (1.0 equivalents on determined epoxy value) before dripping in 50.5 grams of DMEOA (0.97 equivalents) over 5 minutes. The reaction exotherms to 107° C. The reaction is held for one hour. Deionized water (2500 grams) is dipped into the reaction mixture. The mixture is stirred for an additional 20 minutes before discharging and filtering through common sense filters.

EXAMPLE 8

To a five-liter round bottom flask equipped with stirrer, heater, reflux condenser, and a nitrogen inlet port is charged 1134 grams of DOW 331 (BPA based epoxy (equivalent to Epon 828), available from Dow), 466 grams of Bisphenol A, and 1.6 grams of Shell Catalyst 1201. The mixture is blanketed with nitrogen while heating to 120° C. After the mixture exotherms to 194° C. the reaction is held at 157° C. for one hour. At the end of the hold, a sample is taken for epoxy value (EV=1.20 mmol/g) before 400 grams of butanol is slowly added and the reaction is cooled to 86° C. 115 grams of acetic acid (1:1 on EV) is added (which cools the reaction to 77° C.) followed by 162 grams of DMEOA (0.05 equivalents). The reaction exotherms to 106° C. The reaction is held for one hour. Deionized water (2500 grams) is dripped into the reaction over an hour. 300 grams of deionized water is added over an hour with the heat shut off after the first 1000 grams are added. Three thousand grams of the water base epoxy is poured at 46° C. off for evaluation.

EXAMPLE 9

A portion of the composition of Example 8 (circa 2500 g) is heated to reflux with a distillation head with thermometer and condenser taking the place of the condenser. A total of 240 grams of water butanol azeotrope is collected over ca. 4 hours at solution temperature of 95–99° C. and an overhead temperature of 174–194° F. (79–90° C.). After four hours of collection the head temperature rises to 206° F. (97° C.) and distillate no longer separates into organic and aqueous layers. 500 grams of water is added during the course of the distillation as needed to maintain fluidity. Residue butanol is less than 3% of total by gas chromatography (GC) analysis.

EXAMPLE 10

To a five-liter round bottom flask equipped with stirrer, heater, reflux condenser, and a nitrogen inlet port is charged 746 grams of DOW 331, 304 grams of Bisphenol A, and 1.1 grams of Shell Catalyst 1201. The mixture is blanketed with nitrogen while heating to 120° C. After the mixture exotherms to 200° C. the reaction is held at 157° C. for one hour. At the end of the hold, a sample is taken for epoxy value (EV=1.22 mmol/g) before 450 grams of Sartomer CD-551 (350 molecular weight methoxy terminated polyethylene glycol acrylate) and 1.5 gram MEHQ is added and the reaction is cooled to 76° C. 92.2 grams of acrylic acid (1:1 on EV) is added followed by 110.6 grams of DMEOA (0.97 equivalents) and 0.15 grams of phenothiazine. The reaction exotherms to 105° C. The reaction is held for one hour. 2900 grams of deionized water is added over an hour with the heat shut off after the 2000 grams are added.

EXAMPLE 11

To a five-liter round bottom flask equipped with stirrer, heater, reflux condenser, and a nitrogen inlet port is charged 491 grams of DOW 331, 209 grams of Bisphenol A, and 0.7 grams of Shell Catalyst 1201. The mixture is blanketed with nitrogen while heating to 120° C. After the mixture exotherms to 178° C. the reaction is held at 157° C. for one hour. At the end of the hold, a sample is taken for epoxy value (EV=1.22 mmol/g) before 300 grams of Sartomer CD-551 and 1.0 gram MEHQ is added and the reaction is cooled to 76° C. 51.7 grams of acrylic acid (1:1 on EV) is added followed by 65.3 grams of DMEOA (0.97 equivalents) and 0.10 grams of phenothiazine. The reaction exotherms to 92° C. The reaction is held for one hour. 800 grams of methyl ethyl ketone and 200 grams of butanol are added over an hour in place of water to form a solvent-based coating composition.

EXAMPLE 12

To a five-liter round bottom flask equipped with stirrer, heater, reflux condenser, and a nitrogen inlet port is charged 491 grams of Epon 828, 209 grams of Bisphenol A, and 0.7 grams of Shell Catalyst 1201. The mixture is blanketed with nitrogen while heating to 120° C. After the mixture exotherms to 163° C. the reaction is held at 157° C. for one hour. At the end of the hold, a sample is taken for epoxy value (EV=1.22 mmol/g) and 0.1 grams BHT (2,6-di-tert-butyl-4-methylphenol), 1.4 grams of TNBA (tri-n-butylamine (base catalyst) and 17.3 grams of acrylic acid are added and the reaction is held at 145° C. for 30 minutes in order to esterify ca. 30% of the epoxy groups with acrylic acid. After 30 minutes EV has dropped to 0.77 mmol/g, 300 grams of Sartomer CD-55 1 and 1.0 grams of MEHQ are added while cooling to 80° C. The nitrogen blanket is shut off. A low molecular weight acrylic-methacrylic-styrene (20-20-60) co-polymer (AN=286, 38.1% solids in water) is added at 80° C. followed by 61.4 grams of DMEOA and the reaction exotherms to 86° C. The reaction is held for one hour at 90° C., during which time it goes from a milky two phase system to a homogeneous smooth looking mixture. After one hour the resin is cut with 1000 grams of DI water and 5.1 grams of DMEOA and discharged.

Example 13

Formation of Cured Coated Substrate from an Aqueous Coating Composition

Water (2000 g) is dripped into the reaction product of Example 1 over 1–2 hours. Heat is shut off after about half of the water is added to the reaction mixture. The mixture is stirred for an additional 1–2 hours before discharging. The coating composition from is charged to a lined one gallon container equipped with a Hochmeyer blade. Irgacure 1959 photo initiator available from Ciba-Geigy (3% SOS) and Surfynol SEF surfactant (0.1% SOS) are added under moderate agitation. After 30 minutes 1.5% (SOS) of Shamrock XJC-3047 PE/PTFE and 0.05% (SOS) of MPI Super Slip 6530 modified polyethylene (available from Micro Powders) are charged to the reactor. Moderate agitation is continued for 30 minutes before adjusting to rollcoat viscosity (55–75 second, #4 Ford Cup) with deionized water. The finish is filtered through two common sense filters prior to use.

The exterior end coating were applied by bar coating or with a modified Wagner direct rollcoater to 75# base weight tin free steel at 3.5 msi. The coated panels were pre-baked to remove water using a BGK infrared drying unit (90 fpm using three 350 V lamps, 1.3 s residence time).

The warm panels (circa 170° C.) were immediately passed through a AETEK UV processor (2 lamps at 300 W/in, 100 fpm belt speed) to polymerize the SR-256 monomer and the acrylic acid groups. The UV cured film was-not tacky and could be handled and stacked without fear of marring or blocking. The panels were post-baked for 10 minutes at 400° F. (204° C.) after the UV curing. A ten minute bake under these conditions is standard for the coating on the interior side of the can end.

EXAMPLE 14

To a five-liter round bottom flask equipped with stirrer, heater, a reflux condenser, and a nitrogen inlet port is charged 687.4 grams of Epon 828, 292.6 grams of Bisphenol A, and 1.0 grams of Shell Catalyst 1201. the mixture is blanketed with nitrogen while heating to 120° C. The reaction mixture exotherms to 178° C. and is then held at 157° C. After one hour the epoxy value is 1.094 mmol/g and the nitrogen blanket is shut off and the reaction is left open to the air. 420 grams Sartomer CD-551 (350 MW methoxy-polyethylene glycol acrylate) and 1.0 grams of MEHQ is added while cooling the reaction to 80° C. At 86° C., 77 grams of acrylic acid (one equivalent per oxirane group) is added. After five minutes 73.7 grams of DMEOA (0.80 equivalents per oxirane group) is dripped in over five minutes followed by the addition of 0.14 grams of phenothiazine. The reaction mixture is held for one hour at 80–94° C. At this point the resin can be formulated to be a hot melt, a solvent-based coating (e.g., including methylethyl ketone and/or toluene), or a water-based coating.

EXAMPLE 15

The Wen-produced in Example 14 was converted to a water-base coating system by adding 2446 grams of water over one hour while holding the mixture at 70–74° C. The mixture is stirred for another hour while cooling to 54° C. before discharging from the reaction vessel. The final aqueous coating composition contained 61.2 wt. % water and 38.8 wt. % coating solids.

The invention has been described with reference to various specific and preferred embodiments and techniques. However, it should be understood that many variations and modifications may be made while remaining within the spirit and scope of the invention.

What is claimed is:

1. A curable coating composition comprising a coating solids component which includes:
   (A) at least about 30 wt. % of quaternized reaction product obtained from reactants comprising:
      (1) an epoxy resin;
      (2) a sufficient amount of acid to provide about 0.8 to about 4 equivalents of acid groups per equivalent of original oxirane groups in the epoxy resin; and (3) about 0.25 to about 4 equivalents of a tertiary amine per equivalent of the original oxirane groups;

wherein at least 0.25 equivalents of the oxirane groups have been converted by the tertiary amine into quaternary ammonium groups, and the remaining oxirane groups have been converted by the acid into ester groups, and wherein the quaternized reaction product includes at least about 0.25 equivalents of quaternary ammonium salts per equivalent of the original oxirane groups; and (B) at least about 5 wt. % of 2 reactive diluent having a molecular weight of at least about 200; and (C) a curing agent.

2. The composition of claim 1 wherein the acid includes an ethylenically unsaturated acid.

3. The composition of claim 2 wherein the ethylenically unsaturated acid includes carboxylic acid.

4. The composition of claim 3 wherein the carboxylic acid comprises (meth)acrylic acid.

5. The composition of claim 1 wherein the reactive diluent includes (meth)acrylate ester.

6. The composition of claim 5 wherein the reactive diluent comprises a (meth)acrylate ester of hydroxy-functional polyether, a (meth)acrylate ester of hydroxy-functional polyester, or a mixture thereof.

7. The composition of claim 6 wherein the reactive diluent includes an acrylate ester of a polyoxyethylene monoalkyl ether, a polyoxyethylene diacrylate ester, or a mixture thereof.

8. The coating composition of claim 1 wherein the tertiary amine has the formula $Me_2NR^1$, wherein $R^1$ is a C(1–6) alkyl, a C(1–6)hydroxyalkyl or a benzyl group.

9. The coating composition of claim 3 wherein the epoxy resin includes a glycidyl polyether of Bisphenol A; the carboxylic acid includes acrylic acid; the tertiary amine includes dimethylethanolamine; and the reactive diluent includes methoxy-polyethylene glycol acrylate, polyethylene glycol diacrylate or a mixture thereof.

10. The composition of claim 1 further comprising a heat sensitive free radical initiator; and wherein the reactive diluent includes an ethylenically unsaturated compound having a molecular weight of at least about 300.

11. The composition of claim 1 further comprising a photoinitiator; and wherein the reactive diluent includes an ethylenically unsaturated compound having a molecular weight of at least about 200.

12. The composition of claim 1 further comprising a free radical inhibitor.

13. The composition of claim 1 wherein the reactive diluent includes a hydroxy-functional polyether, a hydroxy-functional polyester, or a mixture thereof.

14. The composition of claim 13 wherein the reactive diluent comprises a polyoxyalkylene/Bisphenol A adduct.

15. An aqueous coating composition comprising a coating solids component which includes:

(A) at least about 30 wt. % of quaternized reaction product obtained from reactants comprising:

(1) an epoxy resin having an epoxy equivalent weight of about 180 to about 5,000;

(2) a sufficient amount of acid to provide about 0.8 to about 4 equivalents of acid groups per equivalent of original oxirane groups in the epoxy resin; and (3) about 0.25 to about 4 equivalents of tertiary amine per equivalent of the original oxirane groups;

wherein at least 0.25 equivalents of the oxirane groups have been converted by the tertiary amine into quaternary ammonium groups, and the remaining oxirane groups have been converted by the acid into ester groups;

wherein the quaternized reaction product includes at least about 0.25 equivalents of quaternary ammonium salts per equivalent of the original oxirane groups; and (B) at least about 5 wt. % of a reactive diluent having a molecular weight of at least about 200; wherein the coating solids component has an acid number of at least about 25; and (C) a curing agent.

16. The aqueous coating composition of claim 15 wherein the reactive diluent includes a (meth)acrylate ester.

17. The aqueous coating composition of claim 15 further comprising a photoinitiator.

18. The aqueous coating composition of claim 15 including from about 20 to about 50 wt. % of the coating solids content and having a #4 Ford cup viscosity of from about 15 to about 75 seconds at 25° C.

19. The aqueous composition of claim 15 wherein the coating solids component comprises about from 65 to about 95 wt. % of the quaternized reaction product and from about 5 to about 35 wt. % of the reactive diluent.

20. The aqueous composition of claim 19 comprising from about 25 to about 40 wt. % of the coating solids component;

wherein the acid includes at least about 50 mole % of an α,β-ethylenically unsaturated carboxylic acid; the epoxy resin has an epoxy equivalent weight of from about 500 to about 3,500; the reactive diluent includes a methoxy-polyethylene glycol acrylate ester, a polyethylene glycol diacrylate or a mixture thereof; and the tertiary amine includes an amine having the formula $Me_2NR^1$, wherein $R^1$ is a C(1–6)alkyl, a C(1–6) hydroxyalkyl or a benzyl group.

21. The aqueous coating composition of claim 20 comprising from about 0.9 to about 1.1 equivalents of the carboxylic acid per equivalent of the original oxirane groups; and from about 0.7 to about 0.95 equivalent of the tertiary amine per equivalent of the original oxirane groups.

22. The aqueous coating composition of claim 15 wherein the epoxy resin includes a Bisphenol A glycidyl polyether; the acid includes acrylic acid; the tertiary amine includes dimethylethanolamine; and the reactive diluent includes methoxypolyethylene glycol acrylate, polyethylene glycol diacrylate or a mixture thereof.

23. A substantially solvent and water free coating composition comprising:

(A) at least about 30 wt. % of quaternized reaction product formed from reactants comprising:

(1) an epoxy resin having an epoxy equivalent weight of about 500 to 6,000;

(2) a sufficient amount of acid to provide about 0.8 to about 1.3 equivalent of acid groups per equivalent of original oxirane groups in the epoxy resin; and (3) about 0.25 to about 1.3 equivalent of a tertiary amine per equivalent of the original oxirane groups;

wherein at least 0.25 equivalents of the oxirane groups have been converted by the tertiary amine into quaternary ammonium groups, and the remaining oxirane groups have been converted by the acid into ester groups;

wherein the quaternized reaction product includes at least about 0.25 equivalents of quaternary ammonium salts per equivalent of the original oxirane groups; and (B) at least about 5% of a reactive diluent having a molecular weight of at least about 200; and (C) a curing agent.

24. The composition of claim 1 wherein the acid comprises sulfonic acid, phosphoric acid partial ester, phosphonic acid or a mixture thereof.

25. The composition of claim 1 wherein a separate quaternary ammonium salt of the acid is present.

26. The aqueous coating composition of claim 15 wherein a separate quaternary ammonium salt of the acid is present.

27. The coating composition of claim 23 wherein a separate quaternary ammonium salt of the acid is present.

28. The composition of claim 1 wherein the curing agent comprises a phenoplast curing agent or an aminoplast curing agent.

29. The aqueous coating composition of claim 15 wherein the curing agent comprises a phenoplast curing agent or an aminoplast curing agent.

30. The coating composition of claim 23 wherein the curing agent comprises a phenoplast curing agent or an aminoplast curing agent.

* * * * *

UNITED STATES PATENT AND TRADEMARK OFFICE
CERTIFICATE OF CORRECTION

PATENT NO.    : 6,300,428 B1                                          Page 1 of 1
DATED         : October 9, 2001
INVENTOR(S)   : Stevenson et al.

It is certified that error appears in the above-identified patent and that said Letters Patent is hereby corrected as shown below:

Column 11,
Line 62, delete "Preferably, the." and insert -- Preferably, the --, therefor.

Column 15,
Line 49, delete "CD-55 1" and insert -- CD-551 --, therefor.

Column 18,
Line 18, after "about" delete "from".
Line 19, after "and" delete "from".
Line 21, delete "from about" and insert -- about --, therefor.
Line 25, after "weight of" delete "from".
Line 36, delete "and from about" and insert -- and about --, therefor.

Signed and Sealed this

Thirteenth Day of May, 2003

JAMES E. ROGAN
*Director of the United States Patent and Trademark Office*